Figure 1:
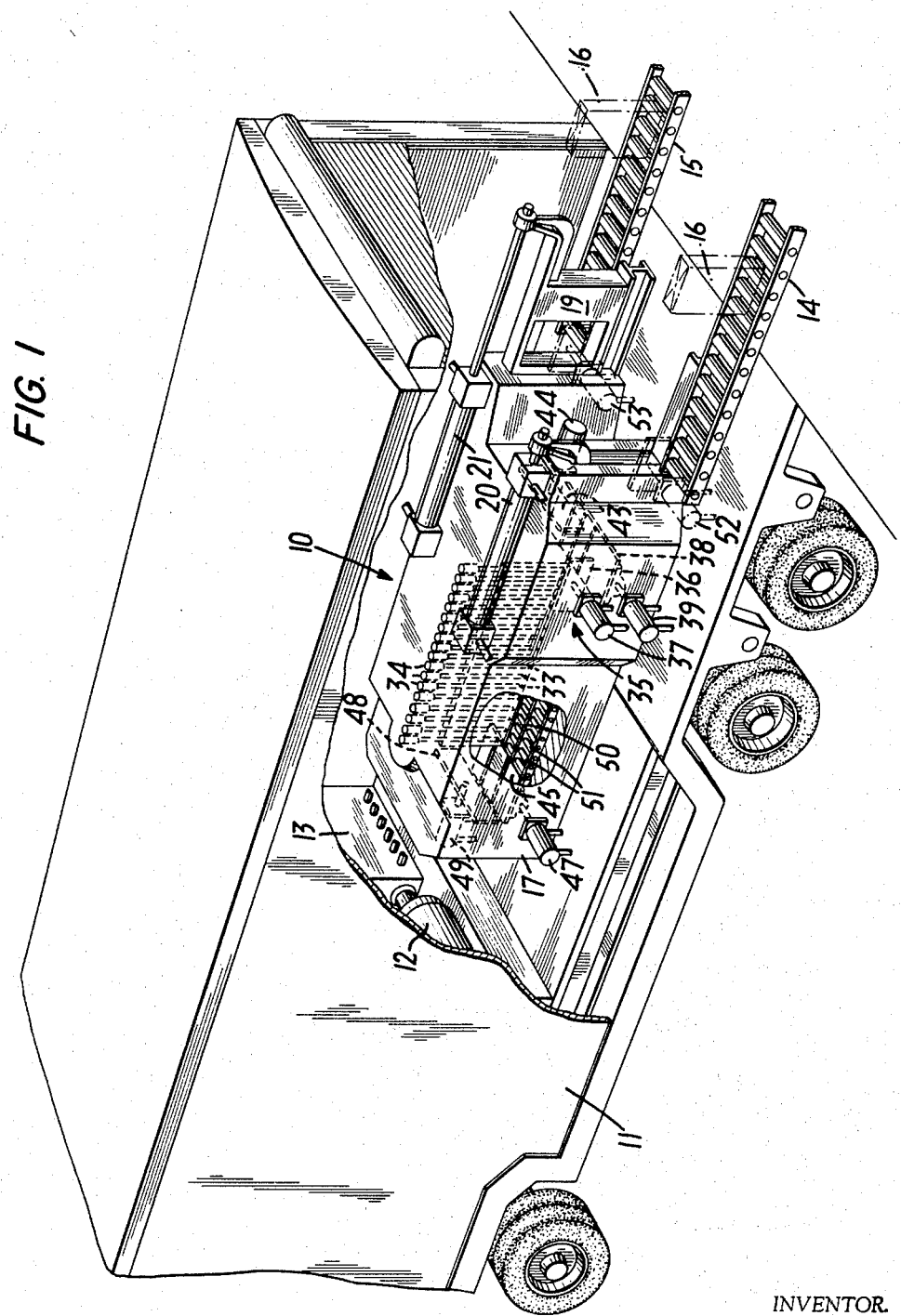

Nov. 12, 1968  J. ARMEL  3,411,002
APPARATUS FOR IRRADIATING GOODS DURING MOVEMENT PAST
A RADIOACTIVE SOURCE MOUNTED IN
A SHIELD ENCLOSURE
Filed June 19, 1963  2 Sheets-Sheet 1

FIG. I

INVENTOR.
JACK ARMEL
BY
his ATTORNEYS

INVENTOR.
JACK ARMEL

United States Patent Office 3,411,002
Patented Nov. 12, 1968

3,411,002
APPARATUS FOR IRRADIATING GOODS DURING MOVEMENT PAST A RADIOACTIVE SOURCE MOUNTED IN A SHIELD ENCLOSURE
Jack Armei, New York, N.Y., assignor to Parsons-Jurden Corporation, New York, N.Y., a corporation of New York
Filed June 19, 1963, Ser. No. 288,974
10 Claims. (Cl. 250—52)

This invention relates to irradiators for subjecting foodstuffs and other materials to radiation and, more particularly, to a new and improved irradiator which is small enough and light enough to be transported from place to place but, at the same time, has a high irradiating capacity such that materials to be irradiated can be processed at a higher rate of throughput than in corresponding conventional irradiators.

In the processing of foodstuffs it is often desirable to irradiate the foodstuffs with gamma rays or the like to prevent or inhibit deterioration in one form or another. The shelf life of food products, for example, can be increased substantially by radio-pasteurization wherein doses in the range from 50,000 to 600,000 rads are applied to the products to destroy bacteria. Radioactive doses of about 50,000 rads, moreover, are sufficient to destroy most insects and their eggs in agricultural products such as grain, tobacco, cotton and hemp, while doses on the order of 20,000 rads can destroy harmful microorganisms such as trichinae and tape worm in meats. Also, the sprouting of onions and potatoes, for example, can be inhibited by relatively low radiation doses in the range from 4,000 to 7,500 rads.

To be fully effective in reducing product deterioration, it is apparent that radiation processing should be accomplished as close as possible to the area of production of the foodstuffs. Conventional foodstuff irradiators, however, are either so bulky and heavy that they cannot be transported from place to place and therefore require that the foodstuffs be brought to them, or if made light enough for transportation, they have such low source activity that large quantities of foodstuffs cannot be processed efficiently.

Accordingly, it is an object of the present invention to provide a new and improved irradiator which is small enough and light enough to be readily transportable while at the same time providing a high enough irradiating capacity to process foodstuffs efficiently.

Another object of the invention is to provide an irradiator of the above character permitting substantially automatic operation at a preselected rate to provide the proper irradiation for a continuous supply of foodstuffs.

An additional object of the invention is to provide an irradiator characterized by simplicity of structure and operation and by minimum maintenance requirements.

These and other objects of the invention are attained by providing a radiation-shielding housing forming an elongated enclosed volume, and a centrally disposed radiation-emitting slab extending substantially from top to bottom of the enclosed volume and along a substantial portion of the length of the volume so as to provide pasageways on opposite sides of the slab and across at least one end of the enclosed volume. The irradiator also includes an arrangement for conveying units of material to be irradiated in longitudinal paths extending parallel to the slab and on opposite sides thereof within the enclosed volume, breech-type loading and unloading mechanisms for transferring units of material into and out of the enclosed volume, and shifting mechanisms for causing the units to move from the loading breech along successive paths within the enclosed volume and into the unloading breech. Preferably, for maximum efficiency of operation, at least two conveying paths are provided on each side of the radiation-emitting slab to carry adjacent rows of units.

Figure 2:
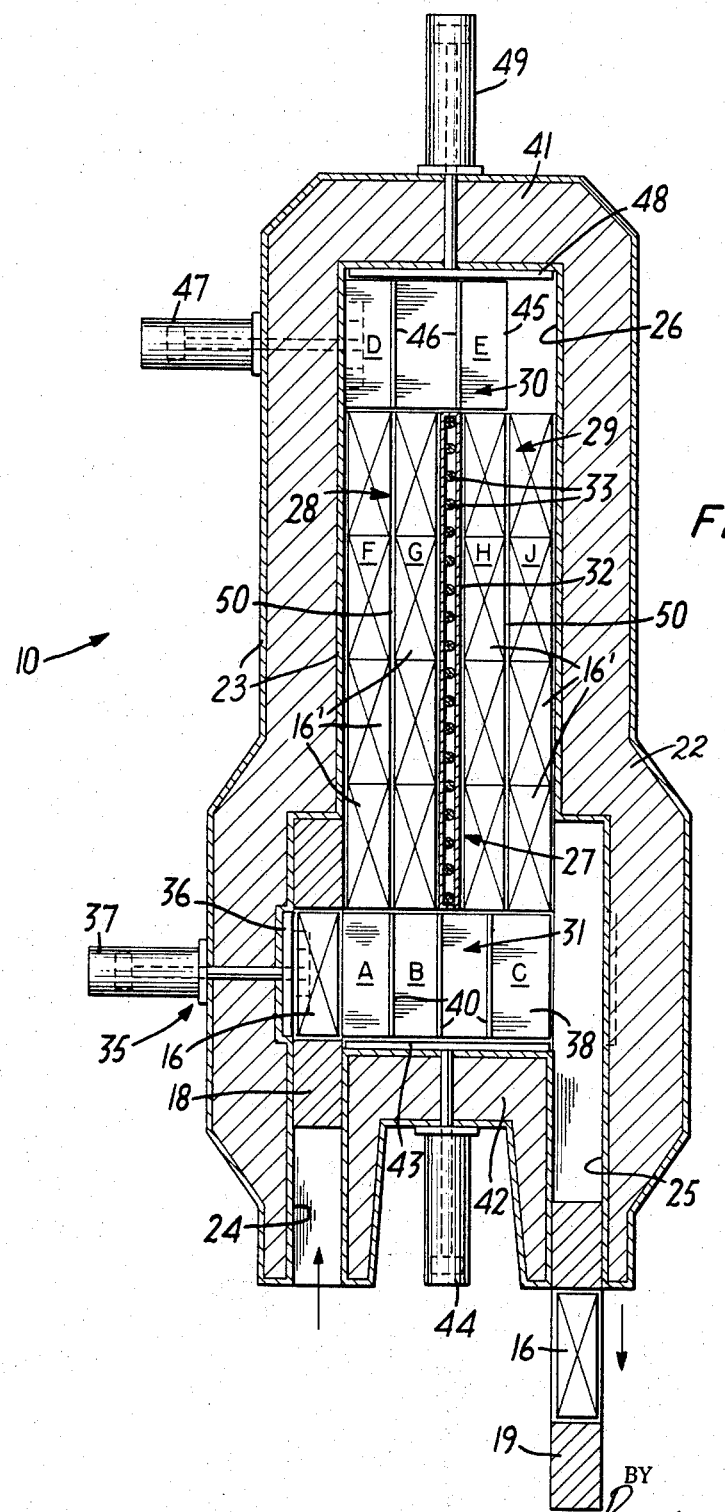

Further objects and advantages of the invention will be apparent from a reading of the following description in conjunction with the accompanying drawings, in which:

FIG. 1 is a fragmentary perspective view, partly broken away, showing a typical mobile irradiator arranged according to the invention and housed in a truck-trailer; and FIG. 2 is a top view in horizontal transverse section illustrating the internal arrangement of the irradiator shown in FIG. 1.

As illustrated in FIG. 1, a representative irradiator 10 according to the invention may be permanently housed in a conventional truck-trailer 11, along with a small power supply 12 and a hydraulic fluid supply system 13 for rapid and convenient transportation of a completely self-contained unit from place to place. To arrange the irradiator for procesing in the manner illustrated in FIG. 1, portable conveyors 14 and 15, which may be carried within the trailer, are set up at the end of the trailer to convey a series of containers 16 holding material to be irradiated to and from the trailer. For bulk materials the containers 16 may be, for example, aluminum containers fifteen inches long by six inches wide by eighteen inches high so as to hold approximately one cubic foot of material each and a supply of about two dozen of such containers is preferably provided with the irradiator as associated equipment. On the other hand, materials already packaged in rigid, firmly closed boxes or cartons of similar or smaller dimensions may be processed directly without placing them in the aluminum containers.

In accordance with the invention, the irradiator 10 comprises an elongated, closed shell 17 made of radiation-absorbing material and provided at one end with a slidable loading breech 18 and a similar unloading breech 19 which are also made of radiation-absorbing material and arranged to convey successive containers into and out of the interior of the shell 17, the breech slides being actuated by corresponding hydraulic cylinders 20 and 21. In the typical embodiment shown in the drawings, the irradiator shell comprises, as best seen in FIG. 2, a lead shield 22 approximately ten inches thick and covered with a stainless steel lining 23, and the breech slides 18 and 19 are each in the form of a rectangular lead frame having end walls ten inches thick and slidable into corresponding openings 24 and 25 in the shell 17, the overall dimensions of the entire irradiator structure being about four feet wide by five feet high by twelve feet long and the total weight with associated equipment being approximately forty tons.

Within the enclosure 26 formed by the shell 17, a radiation source 27 having a slab configuration is mounted in fixed position along a central vertical plane extending substantially from top to bottom of the enclosure and spaced from both end walls thereof so as to provide two longitudinal passageways 28 and 29 on opposite sides and two transverse passageways 30 and 31 at opposite ends. In the typical arrangement shown in the drawings the radiation slab comprises a stainless steel housing 32 approximately five feet long and enclosing eighteen aluminum jacketed quarter inch rods 33 of cobalt 60 which are longitudinally spaced within the housing 32 and extend from top to bottom thereof. The housing 32 not only protects the enclosed radiation source rods from accidental damage by the containers 16, but also prevents contamination of the containers with radioactive material and to assure uniformity of irradiation in the vertical direction of the material in the containers, the housing and source rods project several inches above the top and below the bottom of the containers.

Attached to the top of each rod 33, as best shown in FIG. 1, is a stepped lead shield plug 34, ten inches long, which fits closely into a corresponding opening in the top wall of the shell 17, and in one embodiment, each of the source rods has a specific gamma ray activity of forty Curies per gram and a total effective strength of 4,600 Curies, thereby providing a total effective source strength of 82,70 Curies. With this source strength the irradiator has an irradiating capacity of 500 megarad-pounds per hour for materials having a bulk density of one, yet the protection provided by the radiation-absorbing shell 17 limits the external radiation dose to about 10 milliroentgens per hour at the outer surface of the shell and about 4.5 milliroentgens per hour one meter away from the shell. Inasmuch as a dose of 10 milliroentgens per hour one meter away is permissible, the effective source strength of the described embodiment may, if desired, be increased to 184,000 Curies, providing a 1,100 megarad-pound per hour irradiating capacity, and, moreover, this increase may be accomplished without raising the specific activity of the cobalt 60 by merely increasing the number of rods within the housing to forty, i.e., by spacing the rods on 1½ inch centers rather than 3⅓ inch centers. Accordingly, with an 82,700 Curie source, about 85 containers 16, each holding approximately 58 pounds of a material having unit bulk density, can be given a 100,000 rad dose every hour and, with a 184,000 Curie source, approximately 187 such containers can be passed through the irradiator during each hour to provide the same dose. Alternatively, the individual source elements may comprise strips rather than rods or a single sheet of radioactive material covering the same area may be utilized instead of a plurality of separate elements.

If desired, a special shielded cask (not shown) containing a suitable turret for removing and inserting source rods through the top of the shell 17 may be provided as an accessory. The cask may be used for the storage of rods or for loading or unloading rods during annual replenishment, change of source strength, or emergency maintenance.

To convey a series of containers 16 through the shell 17, the irradiator apparatus includes a number of hydraulically pushers and shuttle platforms arranged to be actuated in timed sequence with the breech slides 18 and 19. All of the hydraulic cylinders for operating these components are connected in a conventional manner to the hydraulic fluid source 13 through appropriate conduits and control valves which are not described in detail or illustrated in the drawings herein since the arrangement will be readily apparent to those skilled in the art from a consideration of the operation of the irradiator apparatus as described hereinafter.

To transfer a container from the loading breech slide 18 to the interior of the shell, the irradiator includes a pusher 35 mounted in the side wall of the shell 17 and having a plate 36 positioned inside the shell so as to engage the side of a container 16 held in the breech slide 18 when the slide is in its innermost position in the opening 24 (FIG. 2) of the shell. A hydraulic cylinder 37 mounted outside the shell is connected to the plate 36 to move it selectively between the recessed position in line with the outer wall of the opening 26 as shown in FIG. 2 and a projected position (not shown) in which it is approximately aligned with the adjacent wall of the shell enclosure 26 so as to move a container from the breech slide 18 into the transverse passageway 31. At the bottom of the transverse passageway 31 is a shuttle platform 38 operated by a hydraulic cylinder 39 (not visible in FIG. 2) so as to be movable transversely between a position in which it is aligned with the shell enclosure 26, as shown in FIG. 2, and a position (not shown) in which the right-hand end, as viewed in FIG. 2, extends into the opening in the unloading breech slide 19 when that slide is in its inner position so as to transfer a container thereto. The distance between extreme positions of the platform 38 is approximately equal to the width of the containers 16 plus the thickness of the source slab 27 and, inasmuch as this distance is slightly greater than the distance required to transfer a container into the breech slide 19, the shell 17 is recessed slightly in this vicinity, as shown in dotted lines in FIG. 2, to receive the end of the platform 38 in its projected position.

To hold the containers 16 in position on the platform as it moves transversely, the top surface thereof is provided with upwardly extending ridges 40 dividing it into three containers-receiving locations designated A, B and C, the location C being spaced from the locations A and B by a distance equal to the width of the containers. In addition, the breech slide 19 includes appropriate catches (not shown) arranged to retain a container in the breech opening after it has been inserted therein by the shuttle platform so that the platform can be retracted without withdrawing the container. In order to transfer containers from the platform 38 into the longitudinally extending passageways 28 and 29 on opposite sides of the radiation source slab 27, another pusher plate 43, actuated by an external hydraulic cylinder 44, is mounted adjacent to the inside surface of the end wall 42 of the shell.

At the other end of the shell another shuttle platform 45, divided by ridges 46 into two spaced container-receiving locations D and E, is movable in the transverse passageway 30 a distance approximately equal to the width of the containers 16 by a hydraulic cylinder 47 so as to abut one or the other of the opposite side walls of the enclosure 26. In addition, to slide containers off the shuttle platform 45, another pusher 48, mounted in the adjacent end wall 41 of the shell, is operated by a hydraulic cylinder 49. The passageways 28 and 29 along each side of the source slab 27 are each separated into two conveying paths, designated F, G, H and J by small dividing ridges or strips 50 so as to permit two rows of containers to pass in opposite directions in each passageway without interfering contact. Also, as shown in FIG. 1, conveying rollers 51 are provided at the bottom of each path to facilitate motion of the containers in the direction parallel to the source slab 27, but, if desired, a metal slide plate which is perforated to pass radiation from the lower portion of the source slab may be substituted therefor. Although the breech slides 18 and 19 may be loaded and unloaded manually outside the shell 17, additional hydraulic pushers 52 and 53, shown in dotted lines in FIG. 1, may be utilized to make the processing operation within the trailer 11 entirely automatic if desired.

In operation, a container 16 holding material to be processed is transferred from the conveyor 14 to the loading breech slide 18 and the hydraulic cylinder 20 is actuated to move the breech slide and container inside the shell 17 so that they occupy the position shown in FIG. 2. Between processing operations the rows F, G, H and J inside the irradiator are normally filled with empty containers 16' as shown in FIG. 2, these having been passed through the irradiator at the end of the previous processing operation to remove the last of the filled containers.

From its position in the breech slide 18, the container 16 is first moved to the location A on the shuttle platform 38 by operation of the pusher 36 which then returns to the retracted position shown in FIG. 2. Thereafter, the hydraulic cylinder 44 is operated to move the container 16 into the first row F in the passageway 28 along one side of the radiation slab 27, at the same time pushing an empty container 16' from the end of that row onto the shuttle platform 45 at the location D. The platform 45 is then moved transversely so that the position D is in alignment with the row G and the pusher 48 operates through one cycle to move the empty container into the row G, thereby pushing another empty container from the opposite end of the row onto the platform 38 at the location B, after which the platform 45 is restored to the posiiton shown in FIG. 2.

With an empty container at B, the shuttle platform 38 is moved to the right, as viewed in FIG. 2, to align the container with the row H on the other side of the source slab and the pusher 43 moves the container into the row H and displaces another container from the other end of the row to the location E on the platform 45, the platform 38 then being restored to the position illustrated in FIG. 2.

At this point a second container 16 carrying material to be processed is moved into the position A in the manner previously described and the pusher 43 is again operated to move this container into the row F, thereby transferring an empty container to the location D on the shuttle platform 45. The platform then moves to its right-hand position as viewed in FIG. 2 and the pusher 48 is reciprocated, this time moving one container from the position D into row G and another from position E into row J and at the same time pushing containers from the opposite ends of these rows onto the platform 38 at locations B and C, the platform 45 thereafter being restored to the left-hand position. With the unloading breech slide 19 moved to its innermost position, the shuttle platform 38 is driven to the right, carrying the container at location B into a position in line with row H and moving the container at C into the breech slide opening. Operation of the pusher 43 moves the container from location B into row H and, after the pusher has been retracted and the platform 38 has been restored to the left, the cylinder 21 (FIG. 1) is operated to project the breech slide 19 thereby moving the container out of the irradiator.

Another filled container is then transferred to the position A and the above-described cycle of operations is repeated. This sequence of operations continues until all of the material to be irradiated has been pocessed and the interior of the irradiator is again filled with empty containers. The entire sequence of operations may be controlled by an adjustable timer, for example, and appropriate interlock switch arrangements may be provided to assure completion of each operation prior to commencement of a subsequent operation. For any given source strength the radiation exposure depends upon the length of time it takes for a container to pass through the irradiator and, for an exposure of 100,000 rads, the container residence time is approximately 11 minutes, each cycle of operation being completed in about 42 seconds. Inasmuch as the sequence control timer may easily be adjusted within a range of about 100 to 1 the dose may be readily varied over a range from 10,000 to 1,000,000 rads without any change in the radiation source.

The above-described utilization of a double row of containers on each side of the source slab contributes to the exceptionally high efficiency and irradiating capacity of the irradiator since radiation passing completely through the material in the containers in the rows immediately adjacent to the slab is effective to irradiate the material in the containers in the outer rows and, in the illustrated embodiment, about 20 percent of the total dose is received during passage along the outer rows. With the containers maintained in abutting end-to-end relation during their passage along the slab, moreover, reduced efficiency resulting from transmission of radiation through gaps between containers is substantially eliminated. Also, since the containers pass closely adjacent to the outer shell, which reflects a certain proportion of radiation back into the enclosure, the efficiency of the irradiator is corresponding increased. Exemplary of the effectiveness of the invention is the fact that the embodiment illustrated and described herein provides a transverse dose uniformity of about 1.3 to 1 between the outside and the center of the irradiated volume of material. If desired, a third row may be added on each side of the source slab to increase the irradiating efficiency by about 5 percent, but this expedient increases the total weight of the irradiator and requires more rapid operation of the hydraulic components for the same total dose. Also, to accommodate containers smaller in length than the containers 16, the size of the openings in the breech slides 18 and 19 and the strokes of the pushers 43 and 48 may be made adjustable.

In an alternative arrangement (not shown) of the above-described irradiator, the shuttle platform 38 may be widened to the left as viewed in FIG. 2 so that it extends across the enclosure 26 and into one of the two breech slide openings at one extreme position and into the other breech slide opening at the other extreme position. With this arrangement the pusher 35 may be eliminated, but the breech slide 18 must be adapted to receive the shuttle platform below the bottom of a container and transfer the container to the platform as the platform moves to the right. This may be done, for example, by providing the platform with projecting fingers arranged to move upwardly through slots in the bottom of the slide 18.

Although the invention has been described herein with reference to specific embodiments, many modifications and variations therein will readily occur to those skilled in the art. Accordingly, all such variations and modifications are included within the intended scope of the invention as defined by the following claims.

I claim:
1. An irradiator comprising a substantially closed shell of radiation-absorbing material providing an enclosed volume, radiation source means in the form of a slab centrally disposed in the enclosed volume and spaced from opposite sides thereof to provide passageways extending longitudinally along opposite sides of the slab, the slab also being spaced from at least one end of the enclosed volume to provide a passageway extending transversely across the end of the enclosed volume, transfer means including a loading breech made of radiation absorbing material slidable in a recess in the substantially closed shell; for transferring successive units of material to be irradiated into the enclosed volume in sequence and for transferring irradiated units out of the enclosed volume in sequence, and conveying means for conveying the units to be irradiated by intermittent motion with intervening dwell periods of selected duration along successive paths within the enclosure extending along one side, across one end, and along the other side of the radiation source means.

2. An irradiator according to claim 1 wherein the radiation source means comprises a plurality of rods of radioactive material extending substantially from top to bottom of the enclosure and spaced in the longitudinal direction of the longitudinally extending passageways.

3. An irradiator according to claim 2 wherein each rod has, at its upper end, a stepped plug of radiation shielding material received in a correspondingly stepped opening in the shell.

4. An irradiator according to claim 1 wherein the loading breech comprises a frame-shaped member made of radiation-absorbing material having a central aperture to receive a unit of material to be irradiated and slidable into a corresponding opening in the shell to provide communication between the enclosed volume and the frame aperture.

5. An irradiator according to claim 4 including hydraulic drive means for moving the frame-shaped member into and out of the corresponding opening in the shell.

6. An irradiator according to claim 1 wherein the conveying means comprises pusher means disposed at opposite ends of the enclosed volume adapted to push the units in opposite directions parallel to the slab along the longitudinal passageways on opposite sides thereof.

7. An irradiator according to claim 1 wherein the conveying means comprises shuttle platform means disposed in the passageway extending transversely across one end of the enclosed volume and movable in a direction transverse to the longitudinal passageways to transfer units from one side of the enclosed volume to the other side thereof.

8. An irradiator according to claim 1 wherein the conveying means comprises guide means disposed in each of the longitudinal passageways, each guide means defining at least two adjacent longitudinal paths for the units permitting relative motion of units along the adjacent paths without interfering contact therebeween.

9. An irradiaor according to claim 8 wherein the radiation source slab is also spaced from the other end of the enclosed volume oppoiste to said one end to provide a second transverse passageway extending across the other end, and including shuttle platform means disposed in the second transverse passageway and movable in a direction transverse to the longitudinal passageways to transfer units from one longitudinal path to another longitudinal path.

10. An iradiator comprising a substantially closed shell of radiation-absorbing material providing an elongated enclosed volume, radiation source means in the form of an elongated slab centrally disposed in the enclosed volume and spaced from both sides thereof to provide passageways extending longitudinally along opposite sides of the slab, the slab also being spaced from both ends of the enclosed volume to provide passageways extending transversely across both ends of the enclosed volume, first transfer means including a loading breech made of radiation absorbing material slidable in a recess in the substantially closed shell; adjacent to one end of the enclosed volume for transferring successive units of material to be irradiated into the enclosed volume in sequence, conveying means for conveying the units to be irradiated by intermittent motion with intervening dwell periods of selected duration along successive paths within the enclosure, said plaths extending in both directions along one side, across one end, and in both directions along the other side of the radiation source means, said conveying means including pusher means disposed at opposite ends of the enclosed volume and adapted to push the units in opposite directions respectively along paths extending parallel to the elongated slab and shuttle platform means disposed in the transverse passageways at opposite ends of the enclosed volume and movable in directions transverse to the longitudinal passageways to transfer units from one of the paths extending parallel to the slab to another such path, and second transfer means including an unloading breech made of radiation absorbing material slidable in another recess in the substantially closed shell for transfering successive irradiated units out of the enclosed volume in sequence.

References Cited

UNITED STATES PATENTS 3,142,759　7/1964　Jefferson et al. _____ 250—52

FOREIGN PATENTS 927,364　5/1963　Great Britain.

OTHER REFERENCES

Brownell et al.: 'Sterilization of Medical Supplies with Gamma Radiation," Proceedings of the International Conference on the Peaceful Uses of Atomic Energy, vol. 15, pp. 258 to 264, 1956.

WILLIAM F. LINDQUIST, *Primary Examiner.*